(12) United States Patent
Chern

(10) Patent No.: US 7,533,448 B2
(45) Date of Patent: May 19, 2009

(54) HINGE

(76) Inventor: Jr-Jiun Chern, Taichung (TW)

( * ) Notice: Subject to any disclaimer, the term of this patent is extended or adjusted under 35 U.S.C. 154(b) by 470 days.

(21) Appl. No.: 11/306,404

(22) Filed: Dec. 27, 2005

(65) Prior Publication Data

US 2007/0143963 A1 Jun. 28, 2007

(51) Int. Cl.
*E05D 17/64* (2006.01)
(52) U.S. Cl. .................................................. 16/342
(58) Field of Classification Search ............. 16/340, 16/337, 338, 342, 382, 387, 389, 392; 361/680, 361/681, 682, 683; 348/373, 333.06, 794; 455/90.3, 550.1, 575.1, 575.3, 575.4, 575.8
See application file for complete search history.

(56) References Cited

U.S. PATENT DOCUMENTS 5,598,607 A * 2/1997 Katagiri ..................... 16/337
6,085,388 A * 7/2000 Kaneko ..................... 16/338
6,170,120 B1 * 1/2001 Lu ............................. 16/342
6,272,006 B1 * 8/2001 Lee ........................... 361/681
6,657,856 B1 * 12/2003 Lu ............................. 361/683
2004/0125552 A1 * 7/2004 Song ......................... 361/683
2004/0134032 A1 * 7/2004 Lu et al. ..................... 16/342
2005/0034274 A1 * 2/2005 Wu ............................ 16/342
2005/0204509 A1 * 9/2005 Lin et al. .................... 16/342
2006/0023408 A1 * 2/2006 Schlesener et al. ......... 361/683

OTHER PUBLICATIONS

Taiwanese Patent Publication No. M265896, May 21, 1994, 8 pages.

* cited by examiner

*Primary Examiner*—Chuck Y. Mah
(74) *Attorney, Agent, or Firm*—Alan Kamrath; Kamrath & Associates PA

(57) ABSTRACT

A hinge includes a first connector, a second connector and a third connector. The first connector includes a first section and a second section extending from the first section at a right angle. The second connector includes a sleeve and a plate secured to the second section of the first connector. The third connector includes a pivot inserted in the sleeve and a plate extending from the pivot.

16 Claims, 10 Drawing Sheets

C - C

HINGE

BACKGROUND OF INVENTION

1. Field of Invention

The present invention relates to a hinge and, more particularly, to a hinge for connecting two objects to each other so that the hinge can keep the objects at any angle relative to each other.

2. Related Prior Art

Generally, a notebook computer includes a host and a liquid crystal display ("LCD") installed on the host by a plurality of hinges. The hinges enable pivotal movement of the LCD on the host. In order to avoid the LCD bumping the host when the notebook computer is closed, such a hinge includes a block and a sector-shaped positioning plate for abutting the block. When the LCD is large and heavy, the hinges cannot halt the LCD effectively before bumping the host. The LCD might be damaged.

Disclosed in Taiwanese Patent M265898 is a hinge for use in a notebook computer. This conventional hinge provides a two-step process for opening the LCD. It includes a first connector 10, a second connector 20, a first positioning element 30, a second positioning element 40 and a third positioning element 50. The first connector 10 is secured to the host and includes a hole 13 and a groove 14 in communication with the hole 13. The second connector 20 is secured to the LCD and includes a pivot 23. The first positioning element 30 includes a sleeve 31, a slide 34 and a stop 33. The sleeve 31 defines a hole 32. The second positioning element 40 includes a sleeve 41 and two arched tabs 42. The sleeve 41 defines a space 43. The third positioning element 50 includes a sleeve 51, a slide 54 and a stop 53. The sleeve 51 defines a hole 52. The pivot 23 is positioned in the holes 32 and 52 and the space 43. The sleeves 51, 41 and 31 are positioned in the hole 13 while the slides 54 and 34 are positioned in the groove 14. The positioning elements 30 and 50 are identical to each other in shape but opposite to each other in position. As the notebook computer is closed, one of the arched tabs 42 contacts the stop 33 before the LCD bumps the host. In the first step of opening the notebook computer, the second positioning element 40 rotates as well as the second connector 20. The first step ends when the other arched tab 42 contacts the stop 53. This avoids lifting the host. In the second step of opening the notebook computer, the pivot 23 rotates in the sleeve 41 that remains still.

Therefore, the present invention is intended to obviate or at least alleviate the problems encountered in the prior art.

SUMMARY OF INVENTION

According to the present invention, a hinge includes a first connector, a second connector and a third connector. The first connector includes a first section and a second section extending from the first section at a right angle. The second connector includes a sleeve and a plate secured to the second section of the first connector. The third connector includes a pivot inserted in the sleeve and a plate extending from the pivot.

The primary advantages of the hinge of the present invention are the simple structure and the easy assembly.

Other advantages and features of the present invention will become apparent from the following description referring to the drawings.

BRIEF DESCRIPTION OF DRAWINGS

The present invention will be described through detailed illustration of two embodiments referring to the drawings.

DETAILED DESCRIPTION OF EMBODIMENTS

Figure 1:
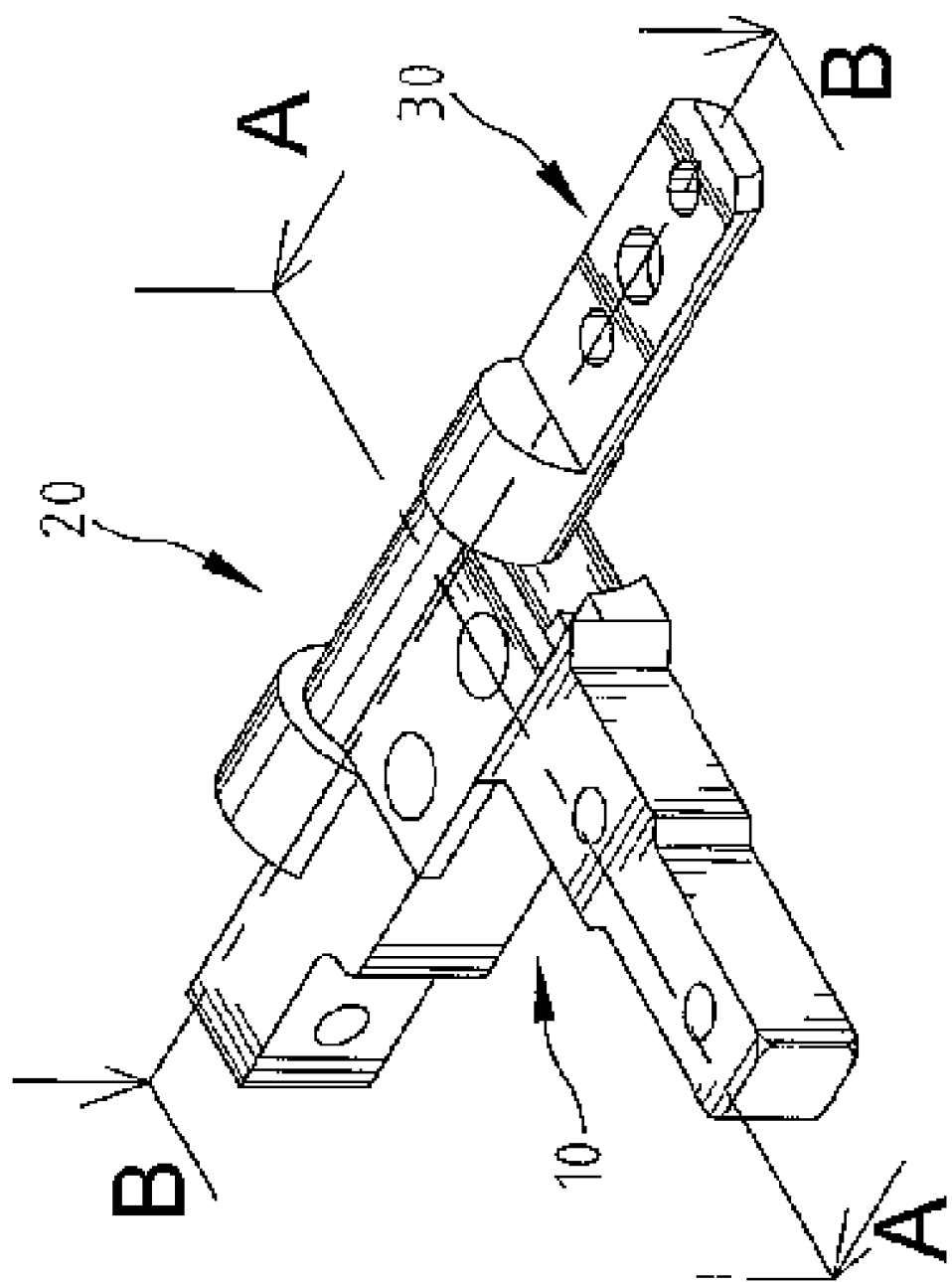
FIG. 1 is a perspective view of a hinge according to the first embodiment of the present invention.

Referring to FIG. 1, there is shown a hinge according to a first embodiment of the present invention.

Figure 2:
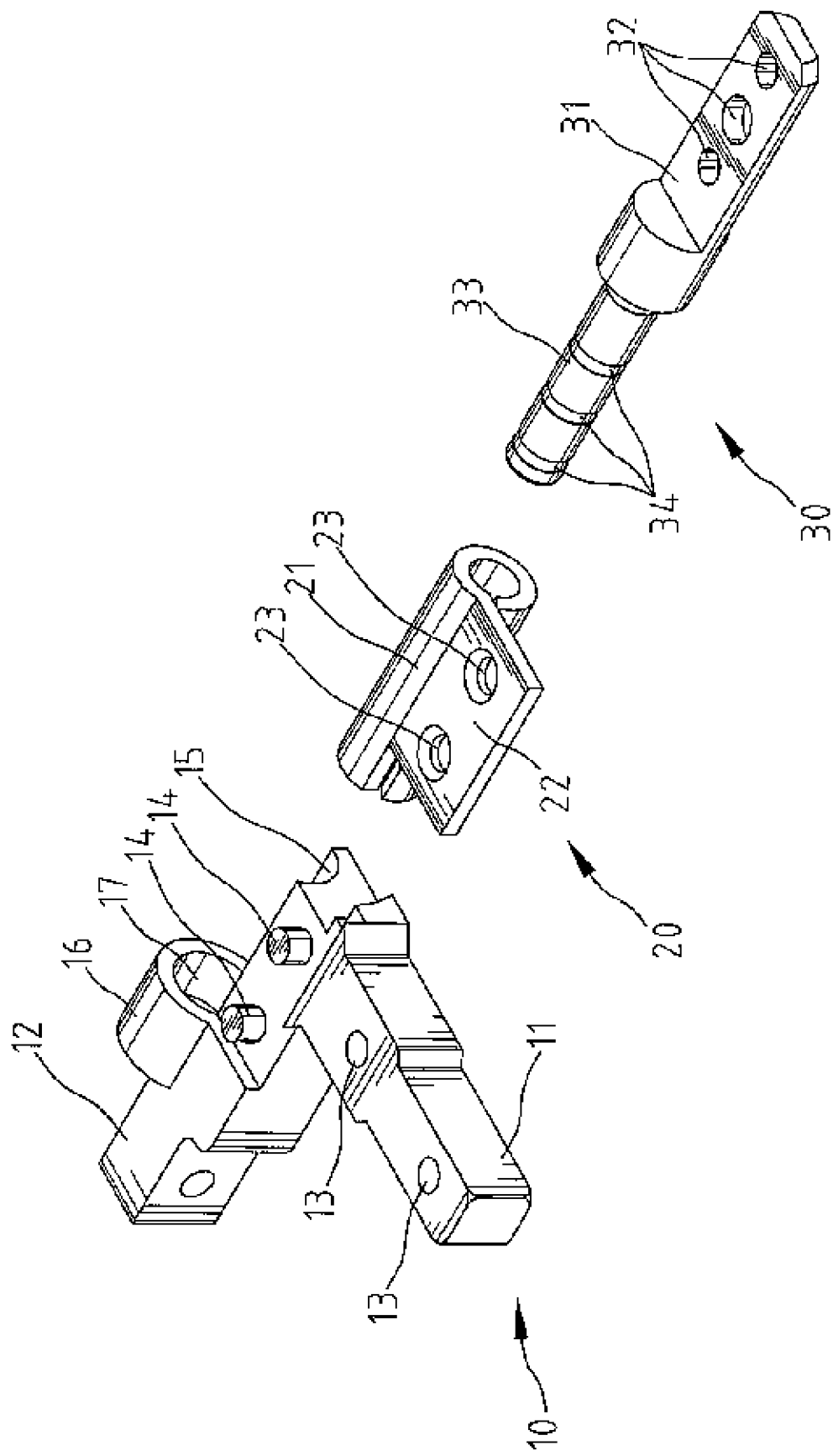
FIG. 2 is an exploded view of the hinge shown in FIG. 1.

Referring to FIG. 2, the hinge includes a first connector 10, a second connector 20 and a third connector 30. The first connector 10 is made with an L-shaped configuration with a first section 11 and a second section 12 extending from the first section 11 at a right angle. There are two apertures 13 in the first section 11 of the first connector 10. The second section 12 of the first connector 10 includes two bosses 14 on an upper surface thereof, a cavity 15 on a side thereof and a ring 16 on the same side as the cavity 15 is. The ring 16 defines a space 17.

The second connector 20 includes a sleeve 21, a plate 22 extending from the sleeve 21, and two apertures 23 in the plate 22. The sleeve 21 extends longer than the plate 22. That is, the sleeve 21 includes an end beyond the plate 22. The sleeve 21 is shaped corresponding to the cavity 15 and the ring 16. The apertures 23 are made corresponding to the bosses 14. The apertures 23 are countersink holes.

The third connector 30 includes a plate 31, a pivot 33 extending from the plate 31, a plurality of apertures 32 in the plate 31 and a plurality of grooves 34 around the pivot 33. The grooves 34 can contain oil that is often provided in such hinges.

Figure 3:
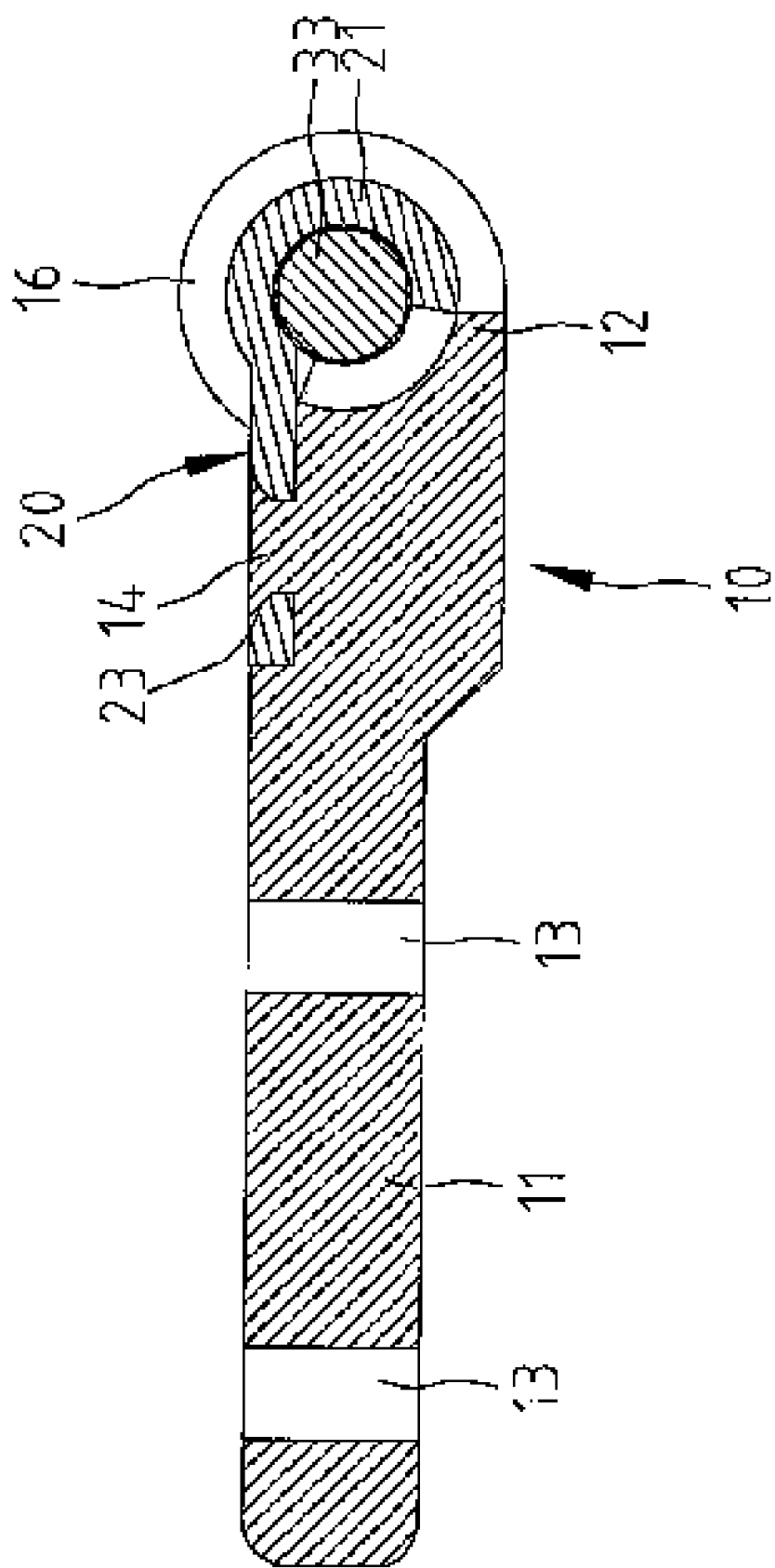
FIG. 3 is a cross-sectional view of the hinge taken along a line A-A in FIG. 1.
Figure 4:
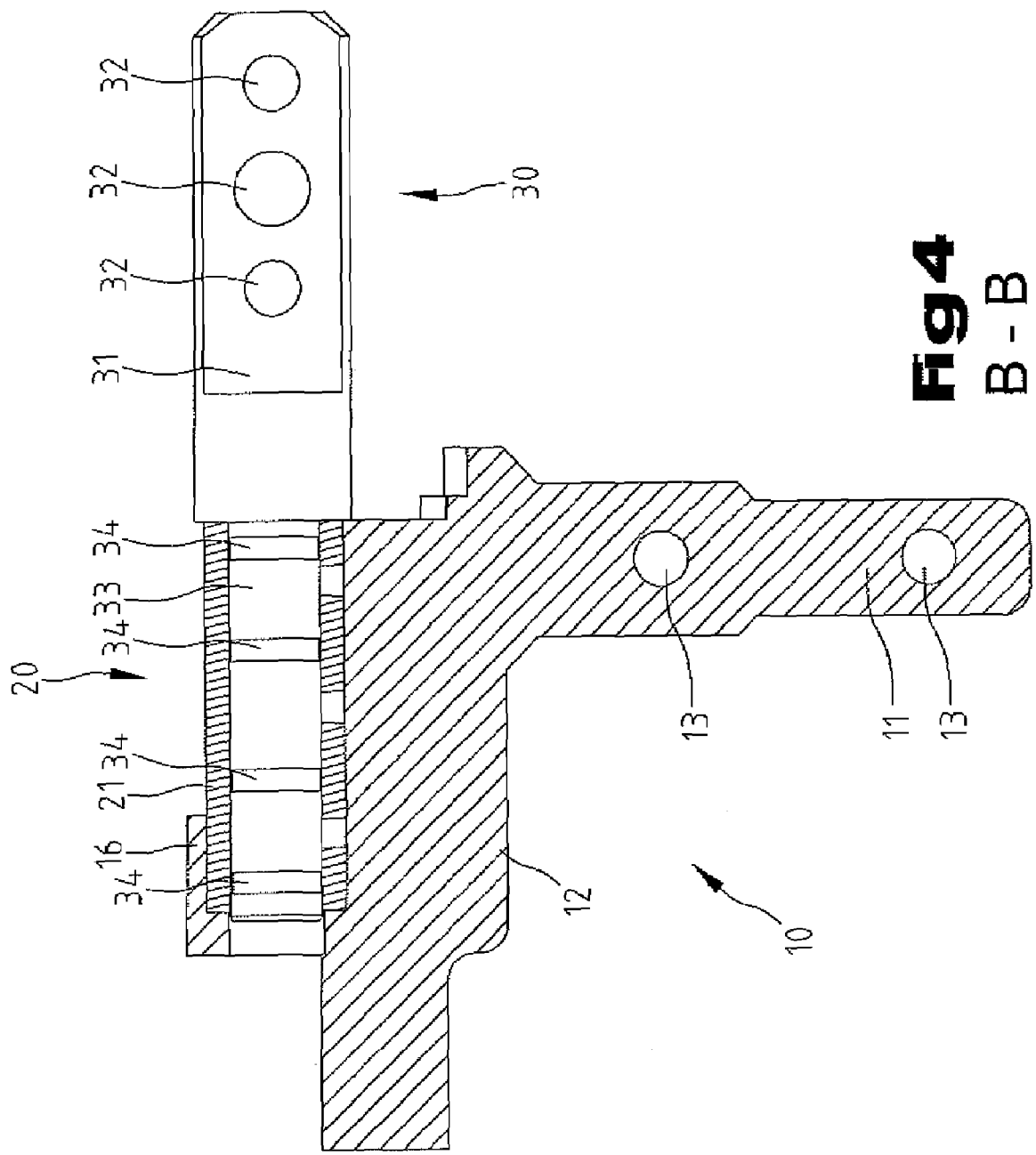
FIG. 4 is a cross-sectional view of the hinge taken along a line B-B in FIG. 1.

Referring to FIGS. 3 and 4, the end of the sleeve 21 is inserted in the ring 16. The rest of the sleeve 21 is positioned in the cavity 15. The plate 22 is positioned on the second section 12 of the first connector 10. The bosses 14 are positioned in the apertures 23. The ends of the bosses 14 are pressed or punched so as to become enlarged heads for securing the plate 22 to the second section 12 of the first connector 10. The pivot 33 is inserted in the sleeve 21.

Figure 5:
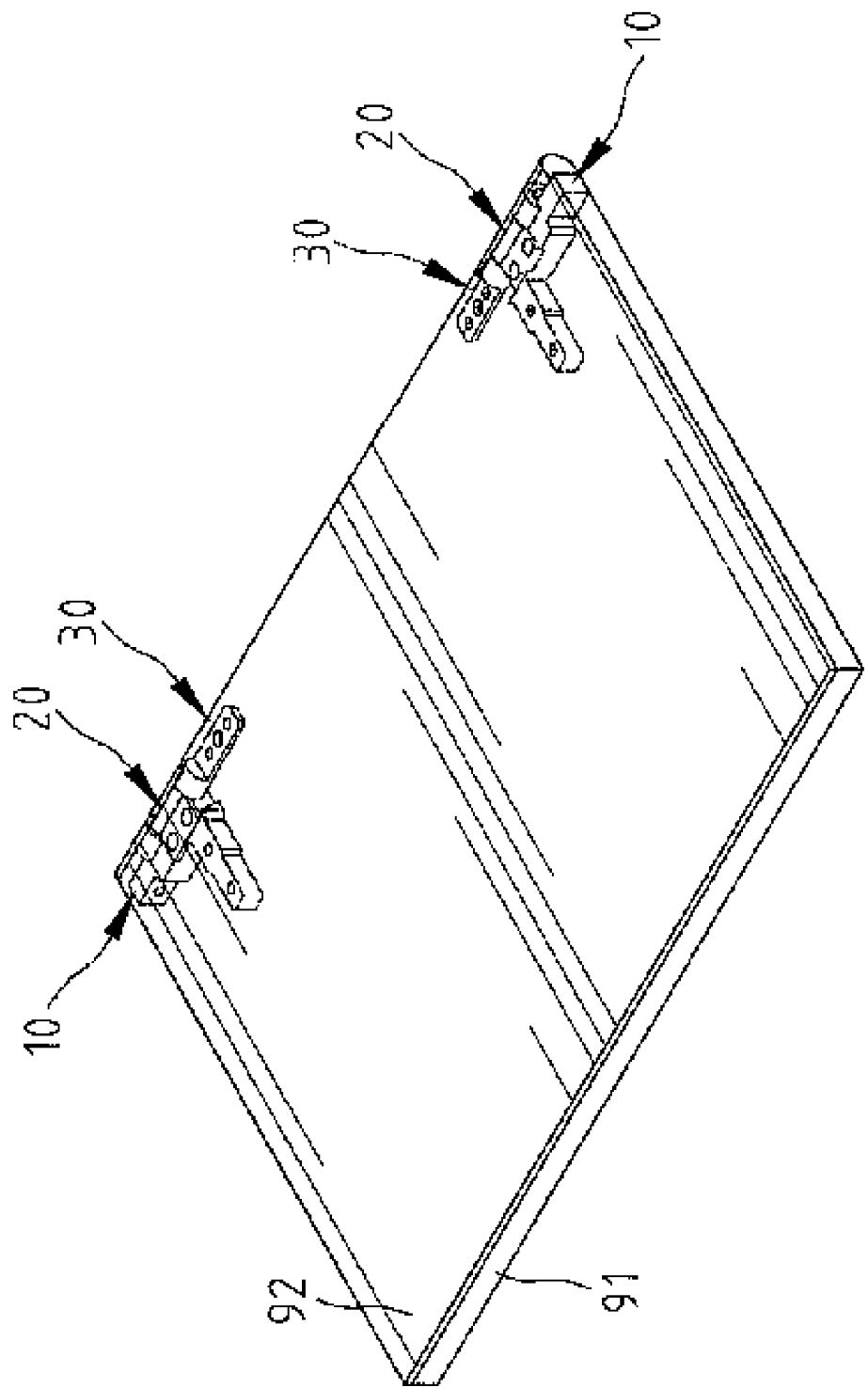
FIG. 5 is a perspective view of a notebook computer using two hinges as shown in FIG. 1.

Referring to FIG. 5, the first section 11 of the first connector 10 is secured to a host 91 of a notebook computer by means of screws through the apertures 13. The plate 31 is secured to a liquid crystal display ("LCD") 92 of the notebook computer by means of screws through the apertures 32.

Figure 6:
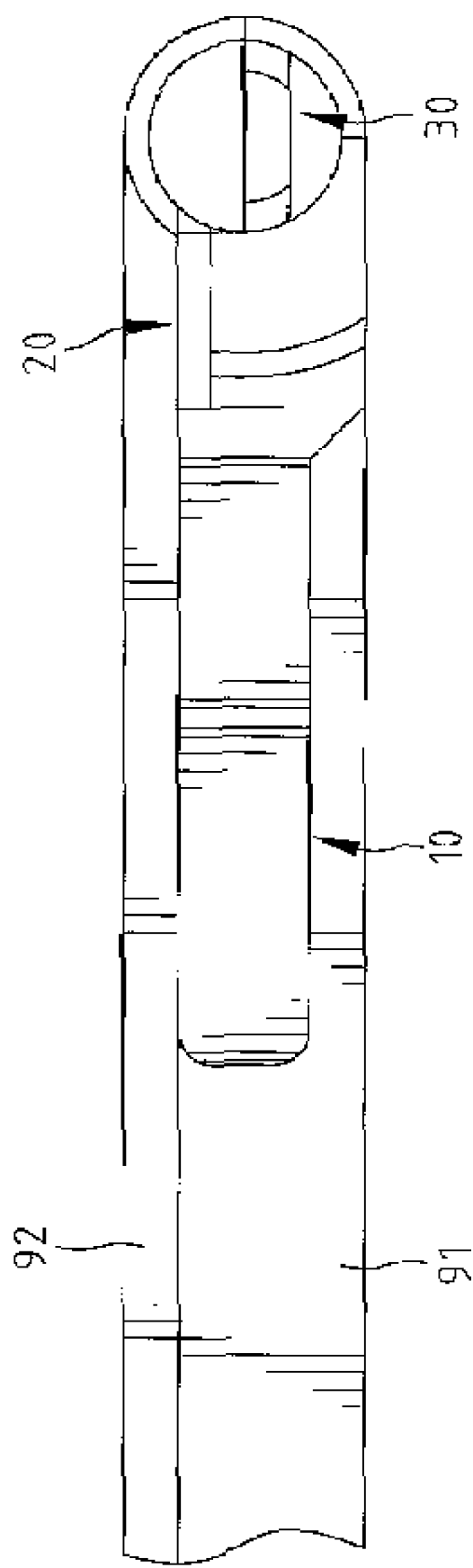
FIG. 6 is an enlarged partial side view of the notebook computer shown in FIG. 5.
Figure 7:
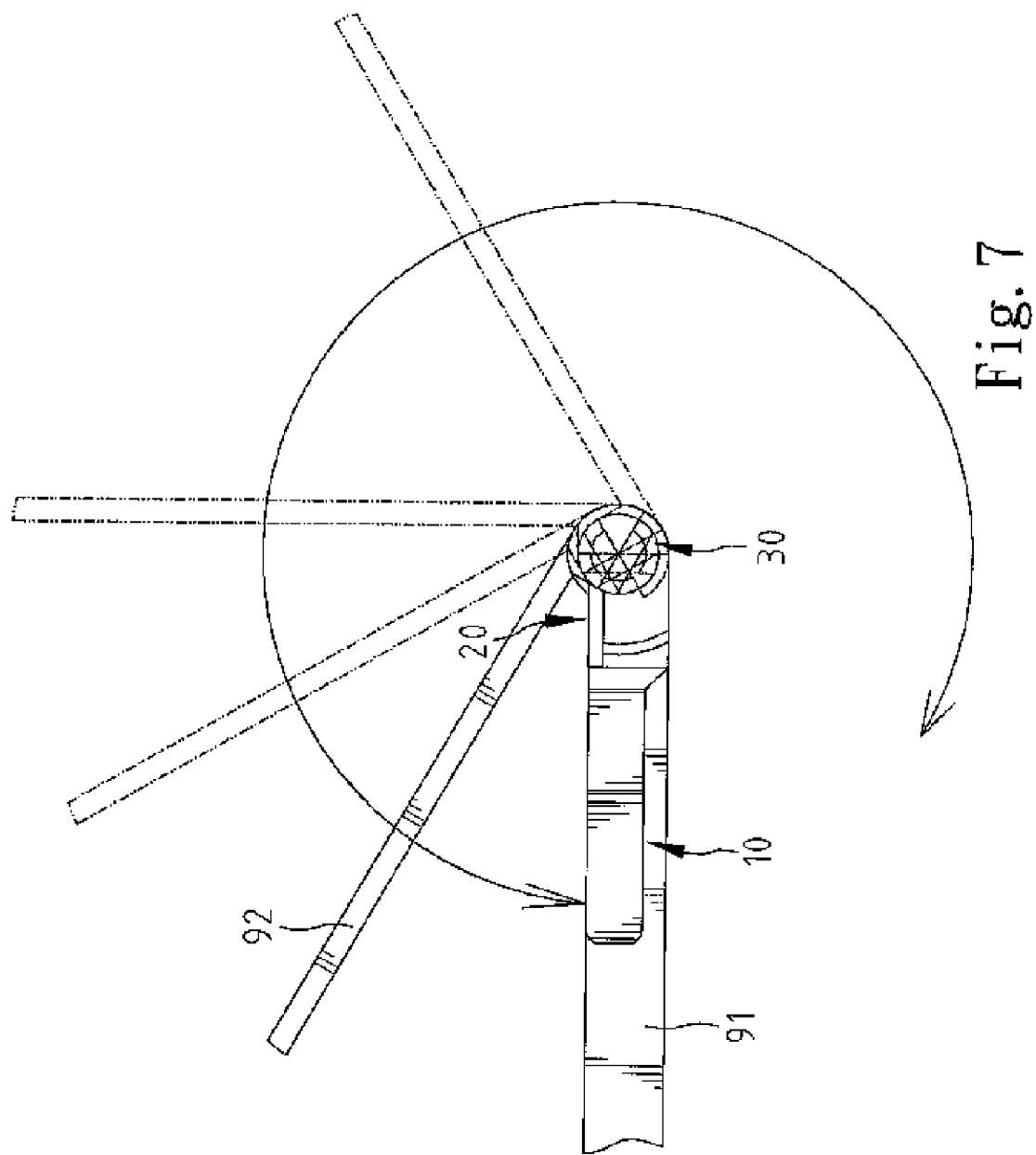
FIG. 7 is reduced side view of the notebook computer in other positions than shown in FIG. 6.

Referring to FIGS. 6 and 7, the LCD 92 can be pivoted to and retained at any angle in a large range on the host 91.

Figure 8:
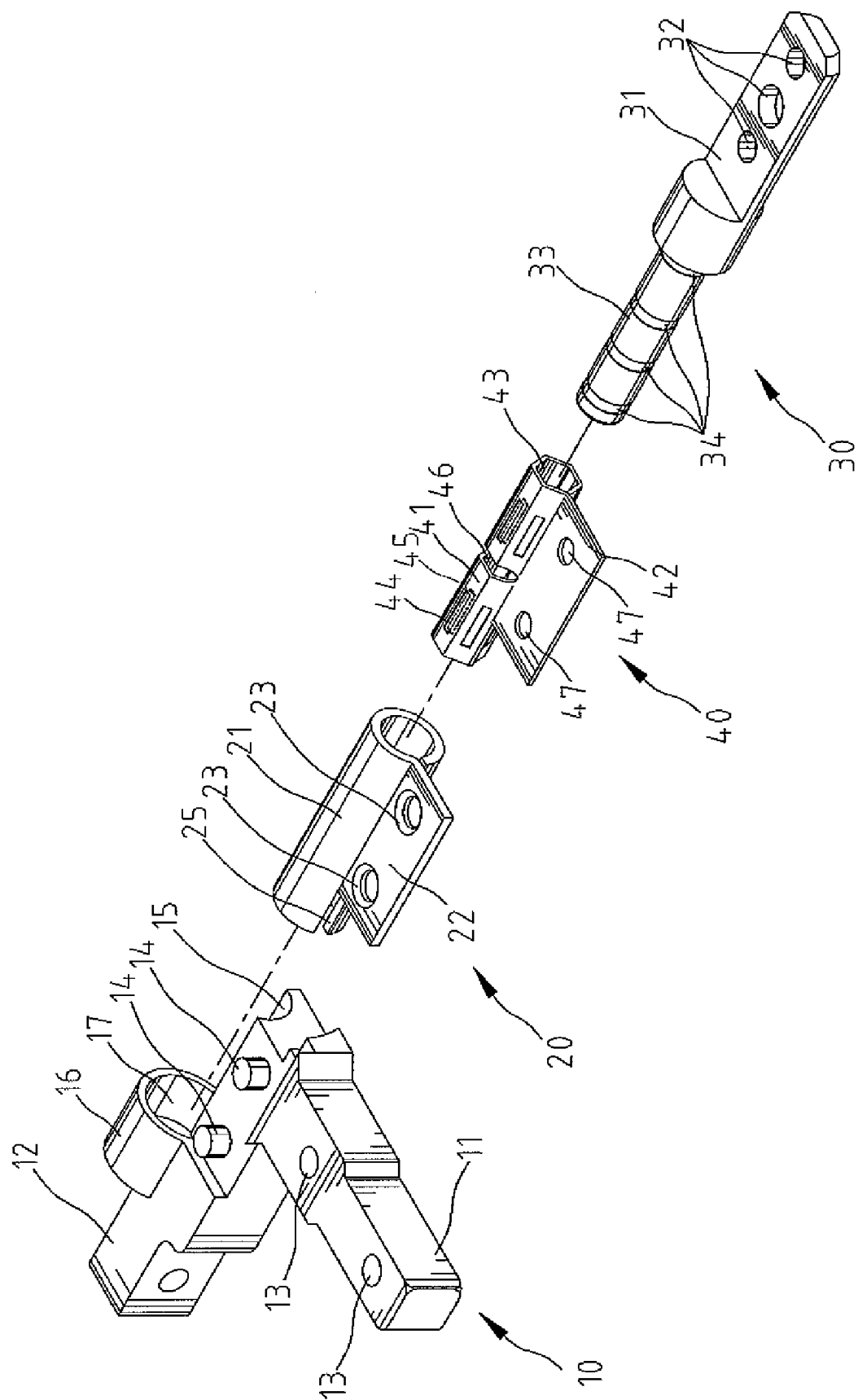
FIG. 8 is an exploded view of a hinge according to the second embodiment of the present invention.

Referring to FIG. 8, there is shown a hinge according to a second embodiment of the present invention. The second embodiment is like the first embodiment except the inclusion of a fourth connector 40 and a slit 25 defined in the sleeve 21. Like the second connector 20, the fourth connector 40 includes a sleeve 41 and a plate 42. The sleeve 41 defines a space 43. The plate 42 defines two apertures 47. Unlike the sleeve 21, the sleeve 41 includes a hexagonal configuration. A groove 44 is defined in each facet on the external surface of the sleeve 41. A ridge 45 is formed on each facet on the internal surface of the sleeve 41. The grooves 44 and the corresponding ridges 45 are made by pressing or punching. A slit 46 is defined in the sleeve 41 in order to improve the flexibility of the sleeve 41.

Figure 9:
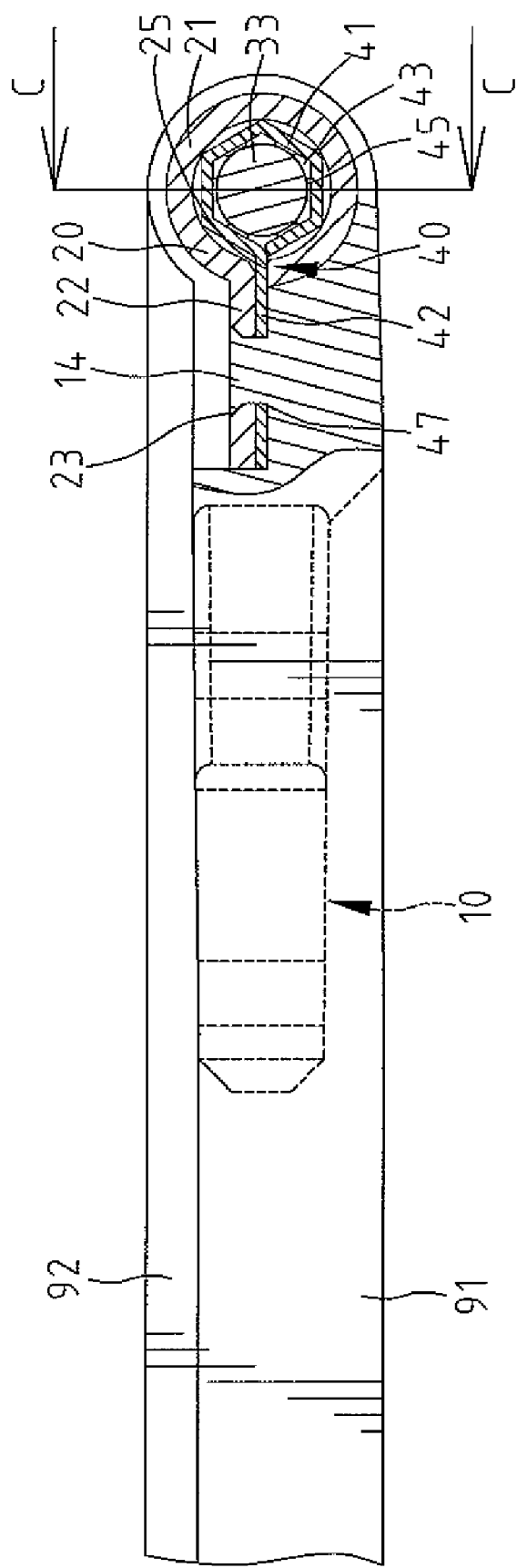
FIG. 9 is a partial cutaway view of a notebook computer using the hinge shown in FIG. 8.
Figure 10:
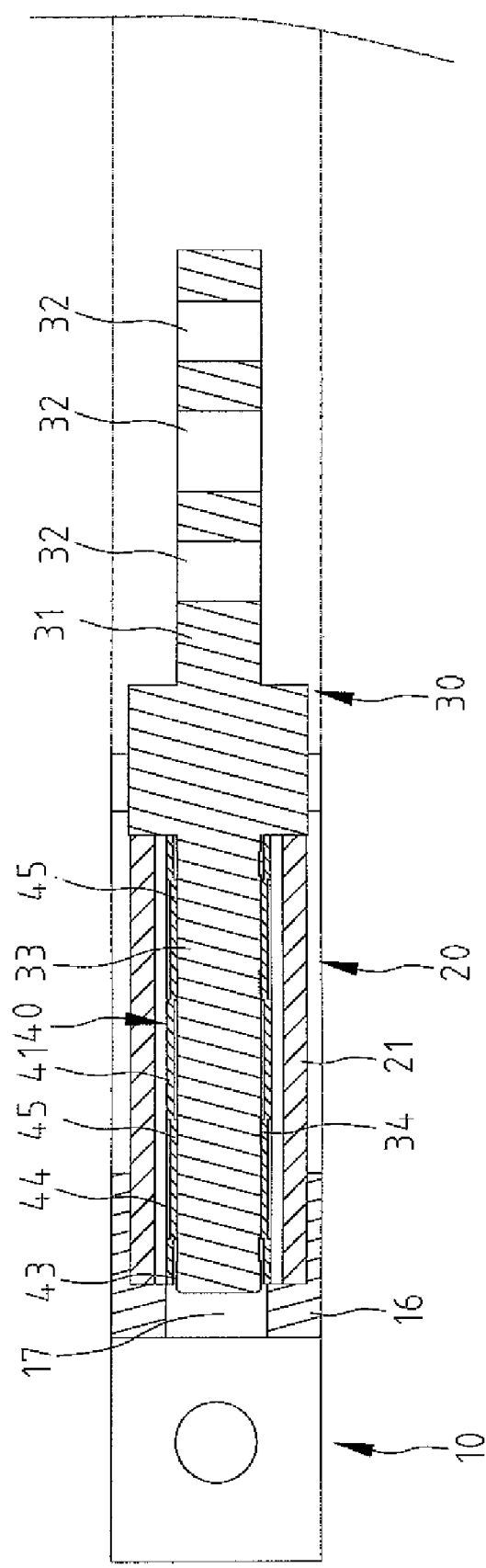
FIG. 10 is a cross-sectional view of the notebook computer along a line C-C in FIG. 9.

Referring to FIGS. 9 and 10, the sleeve 41 is positioned between the sleeve 21 and the pivot 33. The plate 42 is inserted through the slit 25. The plate 42 is sandwiched between the plate 22 and the second section 12 of the first connector 10. The bosses 14 are positioned in the apertures 47 and 23. The enlarged heads of the bosses 14 lock the plates 42 and 22 to the second section 12 of the first connector 10. The sleeve 41 contacts the pivot 33 in six slender regions. Therefore, the sleeve 41 provides proper friction to the pivot 33 so that the hinge allows easy pivotal movement of the LCD 92 on the host 91 yet can hold the LCD 92 in any angle on the host 91.

The hinge of the present invention exhibits two advantages. Firstly, it includes only a few parts, and these parts can easily be assembled. Secondly, it allows easy pivotal movement of the LCD 92 on the host 91 yet can hold the LCD 92 in any angle on the host 91.

The present invention has been described via the description of the embodiments. Those skilled in the art can derive variations from the embodiments without departing from the scope of the present invention. Therefore, the embodiments shall not limit the scope of the present invention defined in the claims.

What is claimed is:

1. A hinge comprising a first connector comprising a first section and a second section extending from the first section at a right angle; a second connector comprising a sleeve and a plate secured to the second section of the first connector; a third connector comprising a pivot inserted in the sleeve and a plate extending from the pivot; and a fourth connector comprising a polygonal sleeve positioned between the sleeve of the second connector and the pivot and a plate positioned between the plate of the second connector and the second section of the first connector, wherein the sleeve of the second connector defines a slit through which the plate of the fourth connector extends.

2. The hinge according to claim 1 comprising at least one fastener securing the plate of the second connector to the second section of the first connector.

3. The hinge according to claim 2 wherein the plate of the second connector defines at least one aperture receiving the fastener.

4. The hinge according to claim 3 wherein the fastener is a boss on the second section of the first connector.

5. The hinge according to claim 4 wherein the boss comprises an enlarged end securing the plate of the second connector to the second section of the first connector.

6. The hinge according to claim 5 wherein the aperture is a countersink holes receiving the boss with the enlarged end.

7. The hinge according to claim 1 wherein the first connector comprises, in the second section, a cavity receiving the sleeve.

8. The hinge according to claim 1 wherein the first connector comprises, on the second section, a ring receiving the sleeve.

9. The hinge according to claim 1 wherein the third connector comprises, around the pivot, at least one groove for containing oil.

10. The hinge according to claim 1 comprising at least one fastener securing the plate of the second connector and the plate of the fourth connector to the second section of the first connector.

11. The hinge according to claim 10 wherein the plate of the second connector defines an aperture receiving the fastener, wherein the plate of the fourth connector defines an aperture receiving the fastener.

12. The hinge according to claim 11 wherein the fastener is a boss on the second section of the first connector.

13. The hinge according to claim 12 wherein the boss comprises an enlarged end securing the plates of the second and fourth connectors to the second section of the first connector 14. The hinge according to claim 13 wherein the aperture in the plate of the second connector is a countersink hole receiving the boss with the enlarged end.

15. The hinge according to claim 1 wherein the fourth connector comprises, on each facet of the internal surface of the polygonal sleeve, a ridge for contact with the pivot with proper friction.

16. The hinge according to claim 1 wherein the polygonal sleeve defines a slit in order to improve the flexibility thereof.

* * * * *